Figure 1:
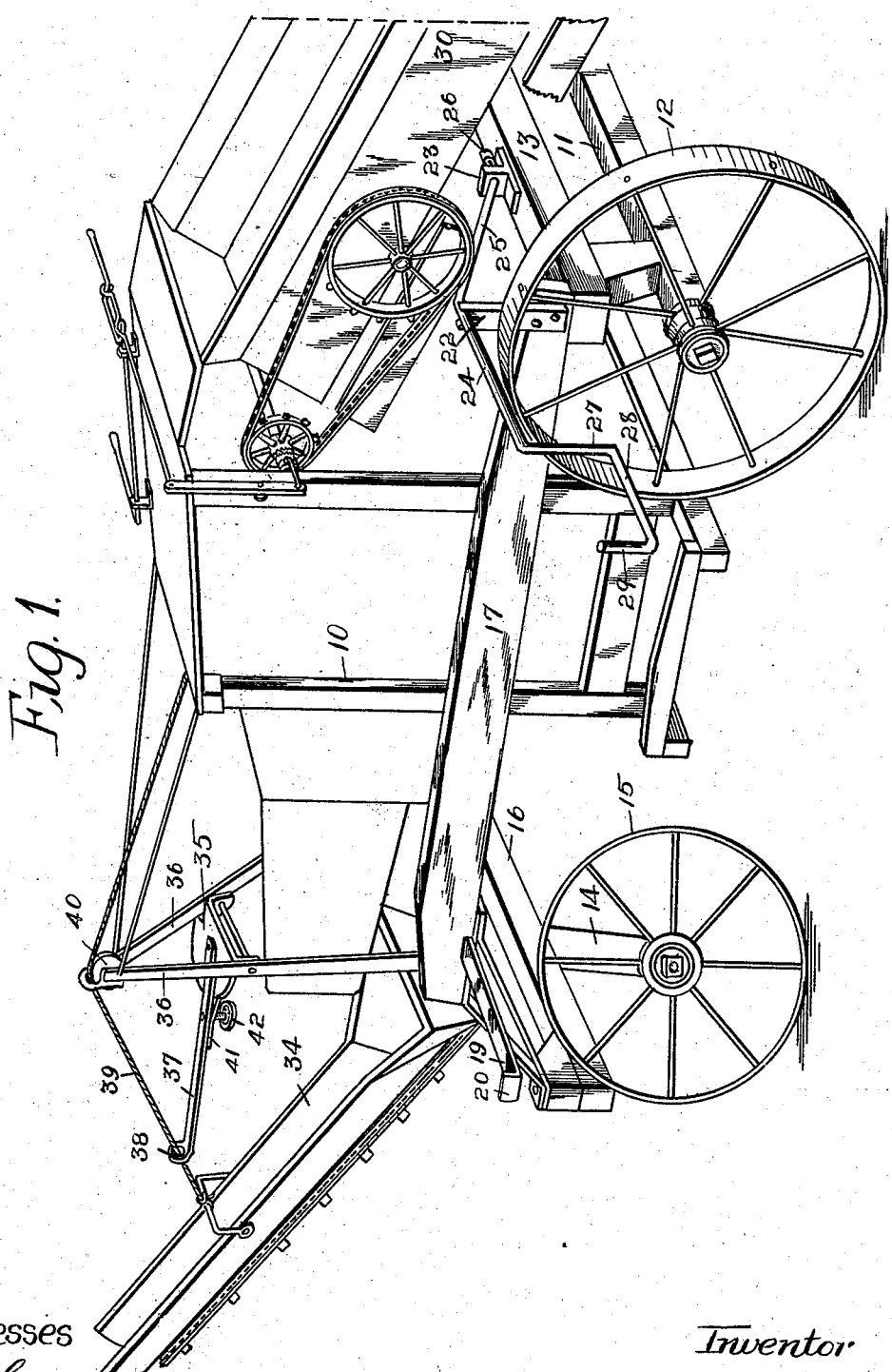

No. 884,944.

PATENTED APR. 14, 1908.

G. B. NELSON.
ATTACHMENT FOR CORN SHELLERS.
APPLICATION FILED DEC. 23, 1907.

2 SHEETS—SHEET 1.

Witnesses
A. G. Hague.
F. C. Dahlberg.

Inventor
George B Nelson,
by Orwig & Lane Attys

No. 884,944. PATENTED APR. 14, 1908.
G. B. NELSON.
ATTACHMENT FOR CORN SHELLERS.
APPLICATION FILED DEC. 23, 1907.
2 SHEETS—SHEET 2.
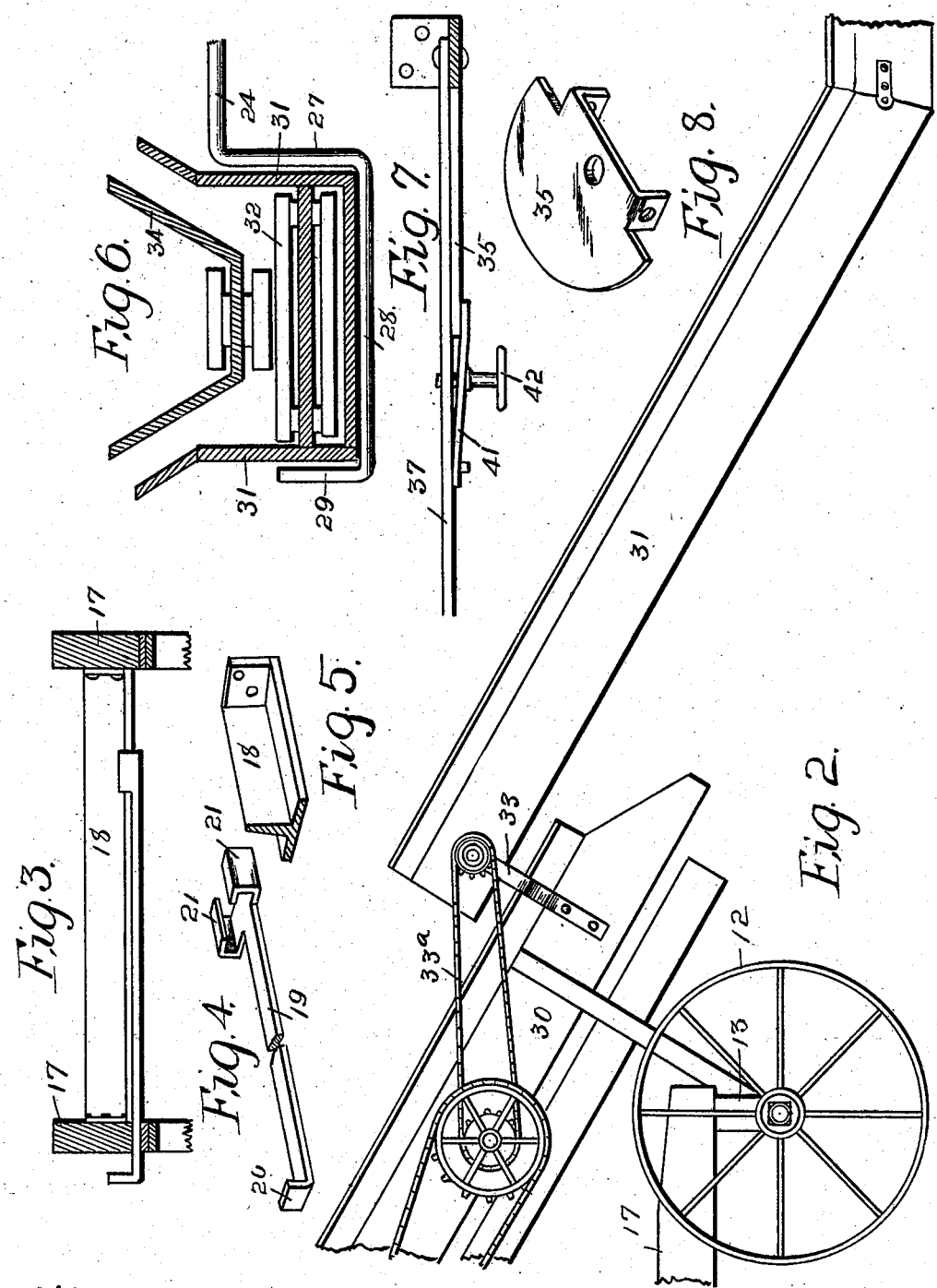
Witnesses
A. G. Hague
F. C. Dahlberg
Inventor
George B. Nelson
by Orwig & Lane Attys

UNITED STATES PATENT OFFICE.

GEORGE B. NELSON, OF REDFIELD, IOWA.

ATTACHMENT FOR CORN-SHELLERS.

No. 884,944.

Specification of Letters Patent.

Patented April 14, 1908.

Application filed December 23, 1907. Serial No. 407,660.

*To all whom it may concern:*

Be it known that I, GEORGE B. NELSON, a citizen of the United States, residing at Redfield, in the county of Dallas and State of Iowa, have invented a new and useful Attachment for Corn-Shellers, of which the following is a specification.

My invention relates to that class of corn shellers in which a feeder conveyer is detachably connected with the corn sheller for the purpose of carrying corn on the cob to the shelling mechanism, and a swinging adjustable conveyer frame is provided for carrying corn cobs from the machine to a wagon or other point of discharge. In some instances, when it is desired to transport the machine from one place to another, a separate vehicle is provided for carrying these conveyers.

My object is to provide supporting devices at one side of the sheller frame designed to receive both of said conveyers, so that they may be carried on the same truck as the machine, and not in any way interfere with the transportation of the machine. In this connection, I have found that supports that project far enough from the machine frame to support these conveyers may in some instances be objectionable, and may prevent the machine from passing through narrow gateways, and a further object is to provide supports so arranged that they may be withdrawn from their projecting positions in cases where it would be objectionable to have them project out from the side of the machine.

A further object is to provide means for supporting the swinging corn cob conveyer frame in any desired position of its adjustment, so that it will not be affected by the wind or be swung laterally from other causes when it has been set to its desired position.

My invention consists in the construction, arrangement and combination with a corn sheller, of the devices for supporting the conveyer frames, and the device for holding the corn cob conveyer frame in a fixed position, whereby the objects contemplated are attained, as hereinafter more fully set forth, pointed out in my claims and illustrated in the accompanying drawings, in which—

Figure 1 shows a perspective view of a corn sheller with the attachments embodying my invention applied thereto. Fig. 2 shows a side elevation of a portion of the rear end of a sheller frame, and a portion of the stationary feeder conveyer frame, and the adjustable feeder conveyer frame operatively connected with the main stationary feeder conveyer frame. Fig. 3 shows a detail view partly in section illustrating the forward conveyer frame support in its withdrawn position. Fig. 4 shows a detail perspective view of the forward conveyer frame support detached. Fig. 5 shows a detail perspective view of a portion of the guiding brace for the forward support. Fig. 6 shows a detail sectional view illustrating the detachable feeder conveyer frame and the delivering conveyer frame resting in the rear support. Fig. 7 shows an enlarged detail view partly in section of the arm for guiding the rope that supports the delivering conveyer to illustrate the means for clamping said arm to its supporting plate, and—Fig. 8 shows a detail perspective view of the plate for supporting the arm that guides the rope of the delivering conveyer.

Referring to the accompanying drawings, I have used the reference numeral 10 to indicate the body of the sheller. This body is mounted upon a rear axle 11 having a supporting wheel 12 at each end.

13 indicates a bolster mounted on the rear axle and forming part of the machine frame.

14 indicates the forward axle swiveled to the frame and having the supporting wheel 15 at each end. Above it is a bolster 16 forming part of the frame. There are two longitudinal side pieces 17 of the machine frame that are connected to the forward and rear bolsters, and near their forward ends these side pieces 17 are connected by means of a cross beam 18 which is preferably of T shape in cross section, as clearly shown in Fig. 5.

The forward support for the conveyer frames comprises a straight body portion 19 having an upward extension 20 on its outer end, and having two oppositely disposed hooks 21 on its inner end, which hooks are designed to overlap the flanges of the cross beam 18 and be slidingly connected therewith. The said body portion 19 projects through a slot in one of the side pieces 17 thus providing a support that may be readily and easily moved to position contained almost wholly between the side pieces 17, to a position extended outwardly from the side pieces 17 far enough to receive the conveyer frames to be hereinafter described. Said support obviously will be firmly held in a horizontal position when at any point of its adjustment.

Mounted upon the rear end of one of the side pieces 17 is an upright 22 having a forked top, and mounted upon the rear bolster 13 is a lug 23 having an opening therein. The rear support comprises a straight body portion 24 having at its inner end a lateral extension 25, having its end projected through an opening in the lug 23 and detachably held therein by a cotter pin 26.

At the outer end of the body portion 24 is a downward extension 27, a horizontal extension 28, and an upward extension 29. The space between the parts 27 and 29 being wide enough to admit the conveyer frames hereinafter described, is clearly illustrated in Fig. 6.

When it is desired to remove the rear support, the operator simply withdraws the cotter pin 26, then slides the support outwardly until it is disengaged from the lug 23, whereupon it may be bodily removed. When said support is in position for use, the part that receives the conveyer frames projects out beyond the rear wheel 12 so that the conveyer frames will not in any way interfere with the movement of the machine.

The stationary feeder conveyer comprises a conveyer frame 30. The structure of this conveyer frame forms no part of my invention, and therefore is not herein specifically shown or described. This conveyer frame is permanently connected with the receiving end of the corn sheller and projects downwardly and rearwardly therefrom a short distance.

The detachable feeder conveyer comprises a frame 31 with a conveyer 32 therein. It is detachably supported upon the brackets 33 at the rear of the frame 30, and the conveyer therein is driven by means of the sprocket gearing 33ª, which is connected to the conveyer of the frame 30. It is this feeder frame 31 that is in some instances carried on a supporting truck when the machine is transported, and the supports before described are for the purpose of holding this frame and also the delivering conveyer frame when the machine is being transported.

At the forward end of the machine frame is the delivering conveyer frame 34 which is of the ordinary construction and is detachably connected, and capable of both lateral and up and down movement. The structure of this conveyer itself, and the means for attaching it to the corn sheller form no part of my present invention, and are not herein specifically shown or described. This delivering conveyer frame is of such size and shape that it may rest within the feeder conveyer frame 30 when the latter is supported at the side of the frame, as shown in Fig. 6.

In order to adjustably hold the delivering conveyer frame in any position of its adjustment laterally, I have provided a hemispherical plate 35 designed to be pivoted to the pulley supporting frame 36.

Pivotally connected to the plate 35 is an arm 37 having at its outer end an eye 38 through which the rope 39 that supports the outer end of the delivering conveyer frame is passed. This rope passes over the pulley 40 at the top of the frame 36. Connected with the under side of the frame 37 is a clamping member 41 with its rear end projected under the plate 35. Extended through the clamping member 41 and seated in the arm 37 is a set screw 42 whereby the clamping member 41 may be made to firmly engage the under surface of the plate 35 and thus hold the arm 37 in any position of its adjustment laterally.

In practical use, and assuming that it is desired to transport the machine, I first move the support 19 to its extended position as shown in Fig. 1, and then place the rear support in the position shown in Fig. 1. I then detach the feeder conveyer frame 31 from the brackets 33 and place it in the supports at the side of the machine frame. I then detach the delivering conveyer frame 34 and place it within the frame 31 as shown in Fig. 6. Then the machine may be transported as an ordinary wagon. In the event that it is desired to pass through a gate-way or other place too narrow to admit the machine with the frames at the side thereof, I first remove the frames from the supports then slide the forward support to position under the machine and remove the rear support. By means of the arm 37, the delivering conveyer frame may be placed in any desired position of its adjustment, and there firmly held so that it will not swing laterally by wind pressure or from other causes, and yet it may readily and quickly be adjusted when desired.

Having thus described my invention, what I claim and desire to secure by Letters Patent, is—

1. In a machine of the class described, an adjustable support capable in one position of supporting a conveyer frame at one side of the machine frame, and also capable of being withdrawn from its projected position, and a second support connected with the machine frame to co-act with the aforesaid support in holding the conveyer frame.

2. In a machine of the class described, a support slidingly connected with the machine frame, and capable of being extended outwardly from the side of the machine frame, and firmly held in position to support a conveyer frame arranged along side of the machine frame, and a second support connected with the machine frame to co-act with the aforesaid support in holding the conveyer frame.

3. In a device of the class described, the combination with a machine frame, of a guide extended across the machine frame, and a support slidingly mounted on the guide and capable in its extended position of supporting the conveyer frame at one side of the machine frame, and a second support connected with the machine frame to co-act with the aforesaid support in holding the conveyer frame.

4. In a device of the class described, a support detachably mounted on the machine frame and extended outwardly therefrom and having its outer end shaped to receive a conveyer frame and support it along side of the machine frame, and a second support on the machine frame to co-act with the first in supporting a conveyer frame.

5. In a device of the class described, the combination of an upright fixed to the rear of the machine frame and having a forked upper end, a lug having an opening therein fixed to the machine frame adjacent to the upright, a support comprising a body portion resting in said forked upright having its inner end extended through the opening in the bracket, the outer end of said support being shaped to receive a conveyer frame, and a second support attached to the machine frame to co-act with the first in supporting the conveyer frame.

6. In a device of the class described, the combination of a support slidingly mounted at the forward end of the machine frame, a second support detachably mounted at the rear end of the machine frame, both supports being shaped to receive a conveyer frame and carry it in position along side of the machine frame.

7. In a device of the class described, a delivering conveyer frame pivotally connected with the machine frame, a cable for supporting the outer end of the conveyer frame, and an arm adjustably connected with the machine frame and having its outer end designed to receive said cable for holding the conveyer frame against lateral movement.

8. In a device of the class described, the combination of a delivering conveyer frame pivotally supported, a pulley supporting frame on the main frame, a cable attached to the delivering conveyer frame and passed over the pulley supporting frame, a plate pivoted to the pulley supporting frame, an arm pivoted to the plate and having its outer end shaped to receive said cable, a clamping member connected to the arm and extended under the plate and a set screw passed through said clamping member and seated in the arm.

Des Moines, Iowa, Nov. 23, 1907.

GEORGE B. NELSON.

Witnesses:
S. F. CHRISTY,
M. E. BENNETT.